United States Patent
Westphal et al.

(10) Patent No.: US 7,813,343 B2
(45) Date of Patent: Oct. 12, 2010

(54) QOS SIGNALING FOR MOBILE IP

(76) Inventors: Cedric Westphal, 335 Fillmore St., San Francisco, CA (US) 94114; Hermant Chaskar, 111 Locust St., #40-C1, Woburn, MA (US) 01801

(*) Notice: Subject to any disclaimer, the term of this patent is extended or adjusted under 35 U.S.C. 154(b) by 196 days.

(21) Appl. No.: 12/061,259

(22) Filed: Apr. 2, 2008

(65) Prior Publication Data
US 2008/0186923 A1 Aug. 7, 2008

Related U.S. Application Data

(62) Division of application No. 10/465,792, filed on Jun. 20, 2003, now Pat. No. 7,453,851.

(60) Provisional application No. 60/389,897, filed on Jun. 20, 2002.

(51) Int. Cl.
H04L 12/28 (2006.01)
(52) U.S. Cl. .................................... 370/389
(58) Field of Classification Search ................. 370/351, 370/389, 400, 401; 709/223–232; 726/30
See application file for complete search history.

(56) References Cited

U.S. PATENT DOCUMENTS

| | | | |
|---|---|---|---|
| 6,374,303 B1 * | 4/2002 | Armitage et al. ............ 709/242 |
| 6,385,451 B1 | 5/2002 | Kalliokulju et al. | |
| 6,425,004 B1 * | 7/2002 | Hardjono .................... 709/223 |
| 6,501,741 B1 | 12/2002 | Mikkonen et al. | |
| 6,643,508 B1 | 11/2003 | Shi | |
| 6,647,001 B1 | 11/2003 | Bhagavath et al. | |
| 6,654,359 B1 | 11/2003 | La Porta et al. | |
| 6,654,610 B1 | 11/2003 | Chen et al. | |
| 6,839,338 B1 | 1/2005 | Amara et al. | |
| 6,937,566 B1 | 8/2005 | Furslow | |
| 6,947,725 B2 | 9/2005 | Aura | |
| 6,963,582 B1 | 11/2005 | Xu | |
| 6,999,436 B2 | 2/2006 | Zheng et al. | |
| 7,006,472 B1 | 2/2006 | Immonen et al. | |
| 7,050,793 B1 | 5/2006 | Kenward et al. | |
| 7,058,017 B2 | 6/2006 | Lee et al. | |
| 7,107,620 B2 | 9/2006 | Haverinen et al. | |

(Continued)

OTHER PUBLICATIONS

International Search Report for PCT application PCT/IB03/02421, mailed Dec. 11, 2003.

(Continued)

*Primary Examiner*—Dmitry H Levitan (57) ABSTRACT

A quality of service (QoS) signaling packet for arranging QoS connections upon handoff between a mobile node (MN) and a correspondent node (CN) using Internet Protocol (IP), the signaling packet includes one or more QoS flow requirements, one or more classifier parameters, QoS session identification information composed of a previous QoS session ID, a new QoS session ID, and a sequence number. The QoS session IDs are used for establishing a new data path and for added security against spoofing, can be composed of a key-based signature combination of a mobile node's new care of address (CoA) and the sequence number. The packet may also include a previous node address and a cookie, both of which are inserted by a previous node. The previous router address is used for backtracking communications and establishing/updating flow tables while the cookie is used for authentication of node-to-node messages.

19 Claims, 5 Drawing Sheets

U.S. PATENT DOCUMENTS

| | | |
|---|---|---|
| 7,123,598 B1 | 10/2006 | Chaskar |
| 7,218,634 B1 | 5/2007 | Khalil et al. |
| 7,343,413 B2 * | 3/2008 | Gilde et al. ................ 709/226 |
| 2001/0046223 A1 | 11/2001 | Malki et al. |
| 2002/0052968 A1 | 5/2002 | Bonefas et al. |
| 2002/0147820 A1 | 10/2002 | Yokote |
| 2002/0191572 A1 | 12/2002 | Weinstein et al. |
| 2003/0035389 A1 | 2/2003 | Chen et al. |
| 2003/0039234 A1 | 2/2003 | Sharma et al. |
| 2003/0101349 A1 | 5/2003 | Wang |
| 2003/0105981 A1 | 6/2003 | Miller et al. |
| 2003/0161287 A1 | 8/2003 | Venkitaraman et al. |
| 2003/0211842 A1 | 11/2003 | Kempf et al. |
| 2004/0008632 A1 | 1/2004 | Hsu et al. |
| 2004/0018841 A1 | 1/2004 | Trossen |
| 2004/0137888 A1 | 7/2004 | Ohki |
| 2004/0240414 A1 | 12/2004 | Fan et al. |
| 2005/0207340 A1 | 9/2005 | O'Neill |

OTHER PUBLICATIONS

Gary Kenward, "General Requirements for Context Transfer", http://tools.ietf.org/id/draft-ietf-seamoby-ct-reqs-05.txt, Internet Engineering Task Force, Oct. 2002.

Y. Bernet, et al., A Framework for Integrated Service Operation over DiffServ Networks, IETF RFC 2998, Nov. 2000.

H. Chaskar, "Requirements of a QoS Solution for Mobile IP", http://tools.ietf.org/id/draft-ietf-mobileip-qos-requirements-02.txt, IETF Mobile IP Working Group, Feb. 10, 2002.

J. Rajahalme, et al., "IPv6 Flow Label Specification", http://tools.ietf.org/id/draft-ietf-ipv6-flow-label-01.txt, IPv6 Working Group, Mar. 2002.

H. Chaskar et al., "A Framework for QoS Support in Mobile IPv6", http://tools.ietf.org/html/draft-chaskar-mobileip-qos-01, IETF Mobile IP Working Group, Mar. 2001.

The International Preliminary Examination Report for PCT/IB2003/02421 completed on Mar. 19, 2004.

* cited by examiner

QOS SIGNALING FOR MOBILE IP

REFERENCE TO RELATED APPLICATION

This application is a divisional of U.S. patent application Ser. No. 10/465,792, filed Jun. 20, 2003, the disclosure of which is incorporated herein by reference in its entirety. U.S. patent application Ser. No. 10/465,792 claims the benefit of U.S. Provisional Patent Application Ser. No. 60/389,897, filed Jun. 20, 2002, the disclosure of which is incorporated herein by reference in its entirety.

FIELD OF THE INVENTION

The present invention relates to Quality of Service (QoS) Signaling and mobile communication networks. More particularly, but not exclusively, the present invention defines methods, protocols and systems for QoS signaling over a mobile network using Internet Protocol (IP).

BACKGROUND

Quality of Service (QoS) is the measure of service quality provided to a subscriber. In contrast to traditional data traffic, multimedia streams such as those used in IP telephony or video conferencing may be extremely bandwidth and delay sensitive, imposing unique QoS demands on the underlying networks that carry them. Unfortunately, Internet Protocol (IP), with a connectionless, "best-effort" delivery model, does not guarantee delivery of data packets in order, in a timely manner, or at all. Consequently, as the Internet evolves from a "best-effort" network to one supporting multimedia communication, it becomes important to be able to signal QoS requirements of applications to the Internet. A number of different scenarios and requirements for QoS signaling are suggested by the Internet Engineering Task Force (IETF) NSIS working group. These scenarios cover a broad scope including, among others:

Terminal Mobility:

The QoS signaling must cope with handoff of end terminal, possibly between network domains with heterogeneous QoS technologies.

Cellular Networks:

The QoS signaling must be able to integrate with cellular access technologies such as, for example, a Universal Mobile Telecommunications System (UMTS) network.

Qos Reservation from Access to Core Network:

The signaling should allow for aggregate QoS provision and negotiation between access and core networks.

Administrative Boundaries:

It should be possible to signal QoS over the administrative boundaries.

Due to the conflicting requirements imposed by these different usage environments (for instance, there is a possible conflict between a lightweight signaling mechanism required over the wireless link and a reliable and robust mechanism required to provision QoS for aggregate traffic in the core network), it is unlikely that the same QoS signaling protocol can be used in all environments. Consequently, it is desirable to have a "QoS signaling toolkit", wherein each tool is optimized for a particular situation such as the following:

Edge QoS Signaling:

This signaling covers signaling between a mobile node (MN) and its access router (AR) as well as horizontal signaling between ARs. The wireless link to the MN induces the requirement of bandwidth economy on the signaling between the MN and the AR. Signaling between ARs imposes requirements similar to those of a context transfer framework.

Data Path QoS Signaling: This signaling covers the signaling along the data path to establish, tear down or modify QoS. The desire for a seamless handoff in a mobile environment induces the requirement of speed on the signaling used to re-establish or maintain QoS upon handoff Further, since there may likely be frequent handoffs in future mobile networks, it would be advantageous to keep the overhead of handoff-induced QoS signaling at a minimal level.

Generic QoS Signaling: This signaling uses a set of rules for increased reliability, robustness or redundancy when there are less bandwidth constraints or time constraints.

Figure 1:
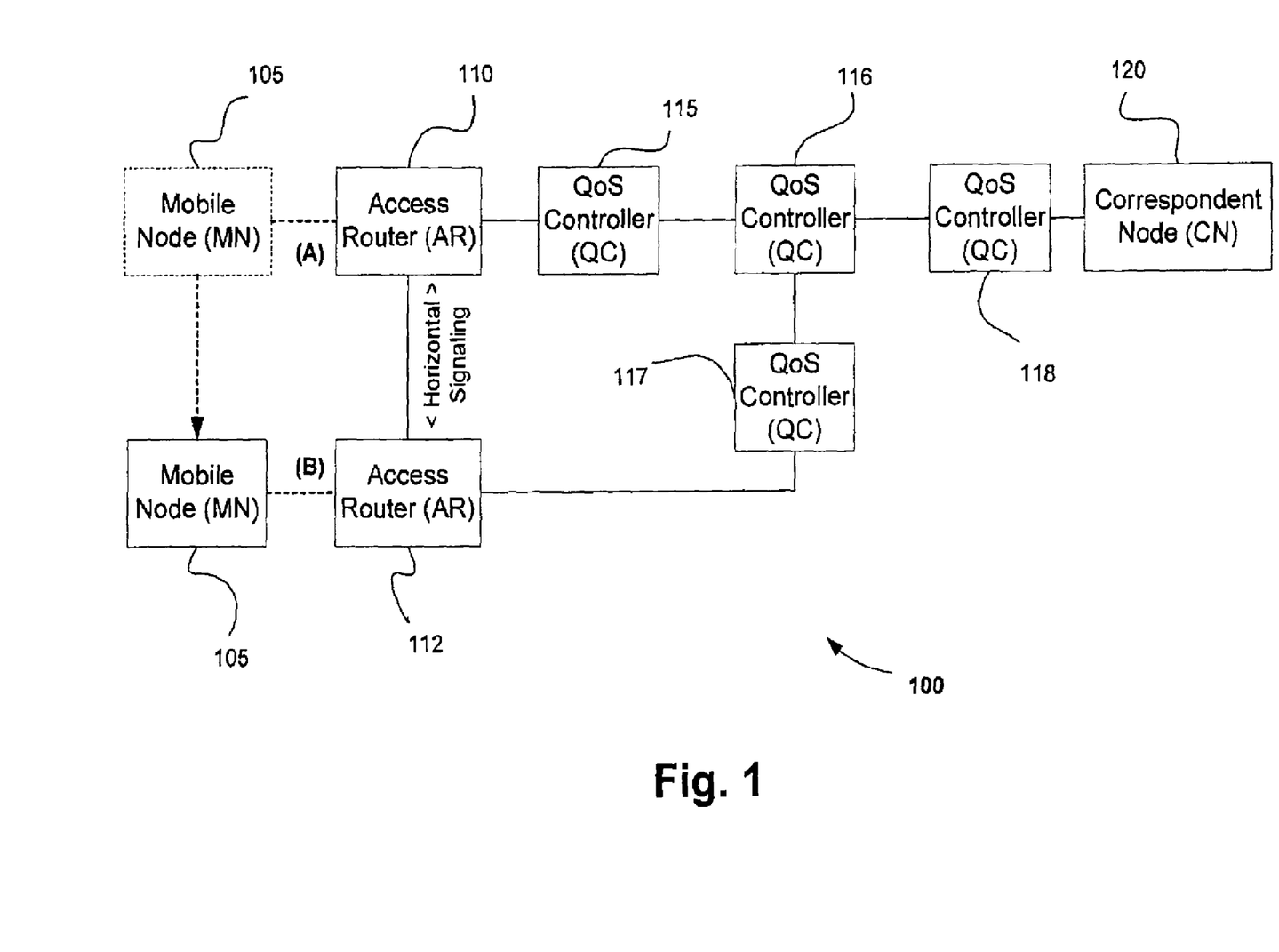
FIG. 1 is block diagram illustrating an example architecture for QoS in a mobile IP environment.

The present invention relates primarily to the Data Path QoS Signaling. Referring to FIG. 1, an example system is shown for QoS and mobile IP handoff in a network 100 having one or more mobile nodes (MN) 105, two or more access routers (AC) 110, 112, two or more QoS controllers (QC) 115, 117, 118 and one or more correspondent nodes (CN) 120. Respective wired or wireless links/data paths (shown by dotted or solid lines) connect the various network components. In this example architecture the QoS signaling tools optimized for mobile IP handoff must cover the horizontal signaling which occurs between AR 110 and AR 112 to begin handoff as well as the vertical signaling along the packet data path (e.g. between MN 105 (or AR 112 on behalf of MN 105) and CN 120), both of which are triggered by the handoff of mobile node (MN) 105, (for example as MN 105 changes connection points from AR 110 at connection A to AR 112 at connection B). The horizontal signaling between ARs 110 and 112 occurs during initiation of the handoff and the vertical signaling between MN 105 (or by AR 112 on behalf of MN 105) and CN 120 typically occurs after the horizontal signaling.

The QoS signaling follows the data path from mobile node MN 105 to correspondent node CN 120 through a set of QoS Controllers (QCs) 115, 116, 117, 118 (depending on the path needed). The QCs could be all the routers on the path, or a subset of routers that effectively control the QoS over the whole path. Among others, QCs 115, 116, 117, 118 perform functions such as multi-field packet classification, admission control, etc. This is similar to the architecture considered in IETF RFC 2998—Y. Bernet, et al., "A Framework for Integrated Services Operation over DiffServ Networks," November 2000. As used herein, the terms QC (or controller) and router may be used interchangeably. However, every router on a path is not necessarily a QC.

The existing IETF protocol to implement QoS signaling is Resource Reservation Protocol (RSVP). RSVP is an IETF standard designed to support resource (for example, bandwidth) reservations through networks of varying topologies and media. Through RSVP, a user's QoS requests are propagated to all routers along the data path, allowing the network to reconfigure itself (at all network levels) to meet the desired level of service. The RSVP protocol engages network resources by establishing flows throughout the network. A flow is a network path associated with one or more senders, one or more receivers, and a certain QoS. For example, a sending host wishing to send data that requires a certain QoS will transmit, via an RSVP-enabled Winsock Service Provider, a "path" message toward the intended recipients. These path messages, which describe the bandwidth requirements and relevant parameters of the data to be sent, are propagated to all intermediate routers along the path.

A receiving host, interested in this particular data, will confirm the flow (and network path) by sending "reserve" messages through the network, describing the bandwidth characteristics of data it wishes to receive from the sender. As these reserve messages propagate back toward the sender, intermediate routers, based on the bandwidth capacity, decide whether or not to accept the proposed reservation and commit resources. If an affirmative decision is made, the resources are committed and reserve messages are propagated to the next hop on the path from the source to destination.

However, RSVP has serious performance drawbacks in mobile IP environments where handoffs happen in the middle of an ongoing session, for example, when the end-to-end path of packets changes or when the care-of address changes after handoff. The OPWA (One Pass with Advertisement) model used in RSVP causes a latency (or delay) of the time for about one round trip between the MN and the CN before the QoS can be established along the new data path. This is because for OPWA, the packets using the new care-of address may get default QoS treatment until they have completed the round trip between the MN and CN. Additionally, RSVP does not have any security mechanisms for protecting against fraudulent QoS set up and tear down in the mobile IP environment.

Furthermore, it is would be beneficial to have QoS signaling that is secure and can be authenticated in order to reduce the susceptibility of QoS to spoofing attacks. A spoofing attack is a message with a header containing a source address that does not reflect the legitimate source of the message. Spoofing attacks may compromise the integrity of establishing and maintaining QoS in mobile IP and should be eliminated if possible.

Consequently, it would be desirable to provide improved methods, systems and protocol for QoS signaling in mobile IP handoffs

SUMMARY

The QoS signaling protocols, methods and systems of the present invention overcome one or more of the drawbacks associated with QoS in mobile IP environments. Certain aspects and features of the present invention include a quality of service (QoS) signaling packet for arranging QoS connections upon handoff between a mobile node (MN) and a correspondent node (CN) in a network using Internet Protocol (IP). The signaling packet in one embodiment of the invention contains information including one or more QoS flow requirements, one or more classifier parameters, QoS session identification information composed of a previous QoS session ID, a new QoS session ID, and a sequence number. The signaling packet further includes one or more mutable parameters for carrying node addresses and/or security information in the form of a cookie.

Further advantages are obtained from a method of establishing QoS for handoffs in a mobile IP network. The network has at least one mobile node, at least two access nodes, a plurality of QoS controllers and a correspondent node. The method includes receiving a QoS signaling packet at one of the plurality of QoS controllers when the mobile node is attempting to handoff between the at least two access nodes. The signaling packet includes one or more classifier parameters, a previous QoS session ID, a new QoS session ID, and a sequence number. The method further includes determining whether the previous QoS session ID in the signaling packet matches any QoS session ID stored in one of the controller's existing flow states and if so, updating the corresponding existing flow state of the controller with the classifier parameters, new QoS session ID and sequence number from the signaling packet.

Yet additional aspects and features of the present invention are included in a method of authenticating a QoS message having mutable parameters. According to one embodiment of the invention, the method includes receiving the message at a node, extracting a cookie included in the message by a previous node, comparing a value of the extracted cookie with a cookie value stored in an existing flow state; and authenticating the message if the extracted cookie value matches the stored cookie value; else not authenticating the message.

The QoS message authenticated may be a signaling packet, a TEAR DOWN message and/or a CONFIRM message.

BRIEF DESCRIPTION OF THE DRAWINGS

Further aspects, features and advantages of the present invention will become apparent from the following description of the invention in reference to the appended drawing in which like numerals denote like elements and in which.

DETAILED DESCRIPTION

The present invention provides a framework for QoS signaling that is optimized for mobile IP handoffs and is particularly suitable for vertical signaling along the packet data path triggered by a handoff of a mobile node (MN). According to certain aspects of the present invention, methods, systems and protocols are disclosed to improve the efficiency of wireless bandwidth and facilitate fast QoS establishment along the new data path after handoff. According to other aspects of the present invention QoS is established and torn down using one or more secure protocol operations.

Vertical signaling is needed to establish the QoS along the new data path when a handoff is made (e.g., a change in a portion of the data path between MN 105 and CN 120 due to the change of the MN's connection to AR 110 at point A to AR 112 at point B in FIG. 1). The vertical signaling is also used to tear down QoS along the segment of the old data path (e.g., between QC 116 and AR 110) that is no longer required after handoff. To effect QoS establishment as fast as possible, the QoS signaling is preferably coordinated with the mobile signaling as described by H. Chaskar and R. Koodli, in "A Framework for QoS Support in Mobile IPv6", March 2001.

There are several unique aspects involved with the QoS signaling in mobile IP handoff including:

(1) The asymmetric nature of the handoff (e.g., MN 105 changes point of attachment (A to B), but the CN 120 does not) implies different treatments for the uplink QoS (e.g., from MN 105 to CN 120) and the downlink QoS (e.g., from CN 120 to MN 105). Also, both uplink and downlink packet paths may get affected even if only one of the end nodes using IP undergoes a handoff.

(2) In a number of cases, a handoff changes only a small segment of end-to-end packet paths near one of the network extremities (e.g., between QC 116 and AR 110 and AR 112 in FIG. 1). When this occurs, the processing of QoS signaling on the unaffected part of the packet path (e.g., between QC 116 and CN 120) should be kept at a minimum.

(3) Security aspects need to be accounted for so as to prevent a malicious node from spoofing the handoff-induced QoS establishment or tear down.

As an MN moves from one AR to another, the paths traversed by MN's packet streams with its correspondent nodes may change (see, e.g., FIG. 1). This is always true for the path in the access network to which the MN is attached. In addition, handover between ARs in different access networks may cause the path traversed by the MN's packet streams in the core network to change as well. If the MN's packet streams are QoS-sensitive, a mechanism is needed to signal the desired QoS forwarding treatment. The forwarding treatment or forwarding information is the type of service an intermediate router offers to packets corresponding to the MN's packet streams, e.g. priority of scheduling, offering certain bandwidth slice on outgoing link etc. along the new paths in the network.

Subsequent to handover, the new end-to-end path between the CN(s) and the MN may span a number of networks (access and core) employing a variety of QoS schemes (e.g., IntServ in access networks and MPLS and DiffServ in core networks). Thus one feature for QoS signaling in the mobile IP environment requires QoS forwarding information for MN's packet streams to relevant routers in different networks in the end-to end path as described by H. Chaskar, in "Requirements of a QoS Solution for Mobile IP", February 2002.

The QoS signaling for mobile IP of the present invention, specific non-limiting examples for which are described below, address the above-noted aspects of QoS establishment in response to mobile IP handoff.

Uplink QoS

The uplink QoS refers to the packet data path from the MN 105 to the CN 120. Reciprocally, the downlink QoS refers to the path in the other direction, from the CN 120 to the MN 105. In IP packets, these paths do not coincide necessarily.

(1) Launching a QoS Signaling Packet:

In this embodiment of the invention, uplink QoS signaling for a handoff is preferably initiated by the new AR (e.g., AR 112 at position B in FIG. 1) upon receiving the QoS context from the previous AR (e.g., AR at position A in FIG. 1) when the QoS context transfer (horizontal signaling between ARs) is successfully executed. When this occurs when the AR 112 launches a QoS signaling packet towards CN 120. However, if the context transfer (horizontal signaling) fails for some reason, MN 105 may launch the QoS signaling packet from the new care-of address (CoA). This signaling packet is preferably launched as soon as MN 105 is ready to send packets to CN 120 from the new care-of address (CoA) of MN 105. This ensures that QoS establishment occurs in time for successful transmission of most of the data packets sent from the MN's new CoA.

The QoS signaling packet(s) of the present invention are preferably formatted so that every node that may need to examine the flow-specific QoS information has an opportunity to process this signaling packet. In one embodiment of the invention, this is achieved by including the QoS information to be carried in the signaling packet as an IPv6hop-by-hop option header.

In another embodiment of the invention, a protocol number is assigned for the signaling packet in the IPv6 main header and the signaling packet includes the QoS related information as the packet payload. Alternatives configurations are also possible and the present invention is not limited to the various manners for implementing the QoS signaling packet format.

Figure 2:
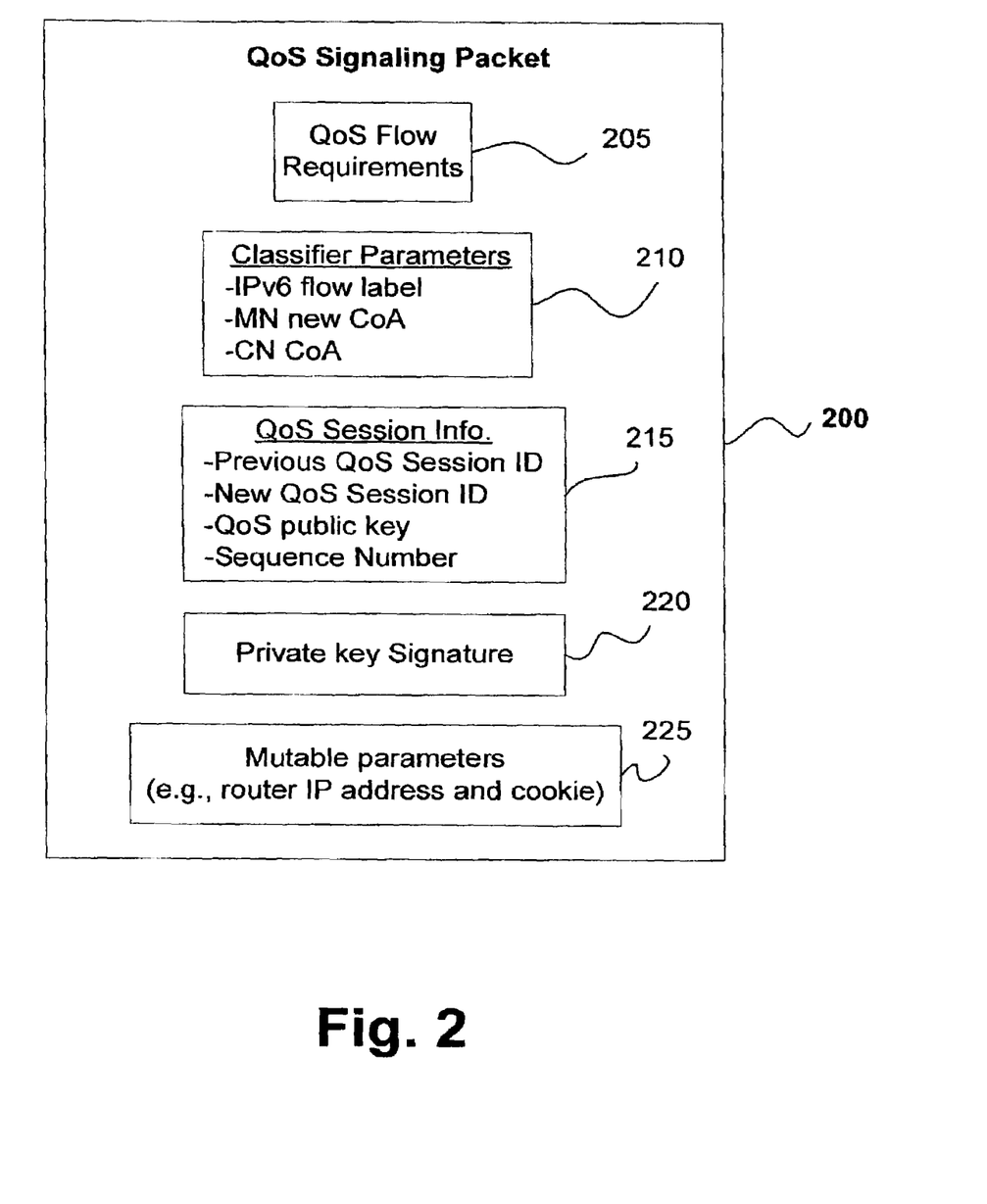
FIG. 2 is a block diagram illustrating information components for a QoS signaling packet according to one embodiment of the present invention.

Referring to FIG. 2, and regardless of the signaling format, the QoS signaling packet preferably carries the following information:

(a) QoS requirements of the flow (205);

(b) Classifier parameters (210);

(c) QoS session identification information (215);

(d) Using the private key of the MN, an optional signature (220) on the immutable parameters of the signaling packet may be provided to ensure their integrity; and (e) Mutable parameters (225) (or allotted space therefore) in the QoS signaling packet (e.g., for storing router addresses and cookies as described below).

In preferred embodiments of the invention, pieces of the foregoing information may either be placed in dedicated fields in the payload or can be inferred from the parameter values in certain header fields. For example, the CoA of the CN can be obtained from the destination IP address in the packet header.

QoS flow requirements 205 specify the requirements of the desired QoS and are similar to those used in conventional QoS requests and may be composed of any data or information to accomplish this end such as bandwidth and delay parameters, scheduling priority, etc.

Classifier parameters 210 allow intermediate nodes to identify the packets of the flow in order to offer a specific forwarding treatment. As discussed by J. Rajahalme, et. al., in "IPv6 Flow Label Specification", March 2002, the classifier parameters may include the IPv6 flow label, the new care of address (CoA) for the MN, and the CN CoA, however, classifier parameters 210 may be any data or information suitable for this purpose.

QoS session identification information 215 is used to identify a flow despite the changes in the CoA of the MN. QoS session identification information 215 also enables secure QoS setup and tear down. For example, a method (described below) of generating QoS session IDs at the MN may be used as a security measure against the spoofing attacks. The QoS session identification information in one embodiment of the invention includes: (i) the QoS session ID prior to handoff (called "previous QoS session ID"), (ii) the QoS session ID after handoff (called "new QoS session ID"), (iii) the QoS flow public key, and (iv) the sequence number. The QoS session ID may be generated as the signature of the combination of the CoA of the MN and a sequence number value at the MN using the MN's private key. The sequence number at the MN is preferably incremented for every QoS signaling packet launched. The MN may need to provide the new QoS session ID to the new AR so that the latter can include it in the QoS signaling packet.

Figure 3:
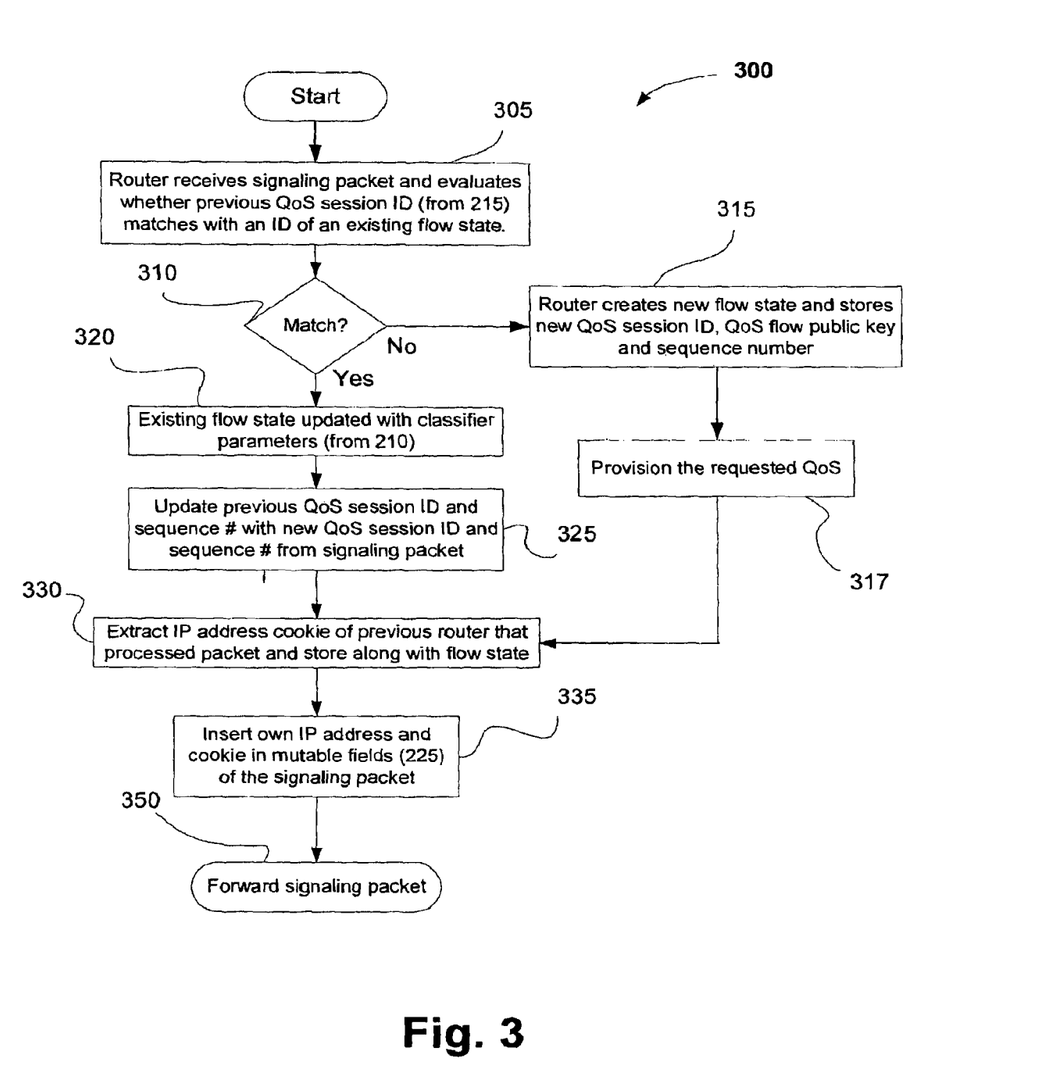
FIG. 3 is a flow chart illustrating a method of updating a QoS signaling packet according to an embodiment of the present invention.

(2) Updating/Creating Flow States in Intermediate Nodes:

A method 300 for updating flow states in an intermediate node will now be described in reference to FIG. 3. In the following description, it is assumed that the router(s) in the new path agree to provide the QoS requested in the signaling packet. On the other hand, if the offered QoS is different from the requested QoS, a negotiation procedure, which is described later, may be performed.

Every router on the path (that needs to examine the flow-specific QoS information) checks 305 whether the previous QoS session ID (from 215; FIG. 2) in the QoS signaling packet matches 310 that associated with one of the existing flow states stored at the router. A flow state in the router preferably contains the current QoS session ID of the flow, the associated QoS flow public key, the current classifier parameters and the current sequence number.

If there is no match 310, the router creates 315 a new flow state and stores in it the new QoS session ID (e.g., from QoS session identification information 215; FIG. 2) obtained from the signaling packet. This flow state may use, for example, the IPv6 flow label, MN new CoA, and the CN CoA of classifier parameters (e.g., 210; FIG. 2), to classify the packets of the flow. The router also preferably stores the QoS flow public key and the sequence number from the QoS signaling packet in the flow state. The router also programs the requested QoS forwarding treatment. Thus, the subsequent packets of the MN traversing this router, which are initiated from the new CoA, are offered the corresponding forwarding treatment.

On the other hand, if there is a match, the router updates 320 the existing flow state with the new classifier parameters (for example, parameters 210 indicated in QoS signaling packet 200; FIG. 2), namely, the IPv6 flow label, the MN's new CoA, and CN's CoA. The router also updates 325 the old QoS session ID and the old sequence number with the new QoS session ID and the new sequence number from the QoS signaling packet.

When the flow states are created 315/updated 320, 325, in one embodiment of the invention, the router extracts 330 the IP address of the previous router that processed the QoS signaling packet and a cookie generated and stored by this previous router (available in the specified mutable fields 225 of signaling packet 200) and stores them along with the flow state. As used herein, a "cookie" is not the same as a traditional "HTML cookie" but rather it is a numeric or alphanumeric character, series of characters, word or other identifier, such as random number, which is inserted by a routing device and read by routers for authenticating communications between routers and preserve data path integrity.

The previous router's IP address may be later used to retrace the packet path for tearing down or confirming the QoS as applicable, while the cookie may be used to authenticate future TEAR DOWN or CONFIRM messages as described in greater detail hereafter. The router then forwards 350 the QoS signaling packet to the next router after inserting 335 its own IP address and a new cookie in the previously mentioned mutable fields (e.g., 225; FIG. 2). Each router on the path may then compare the cookie included by the previous router in the signaling packet with the cookie value stored in its flow state. If the values match, authentication is deemed successful.

(3) Tearing Down Qos Along the Path Segment No Longer Required after Handoff:

A router identifies itself as a "crossover router" if it is the first router along the QoS signaling path that has an existing flow state with a QoS session ID the same as the previous QoS session ID that is contained in the QoS signaling packet.

There are two general categories of security authentication for the methods and systems of the present invention including: (i) public/private key-based authentication (referred to herein as "signature authentication" or "key-based authentication"); and (ii) cookie-based authentication. Generally, only the crossover router uses key-based authentication to authenticate the QoS Session ID which, in one embodiment of the invention, is a signature of a combination of the MN's CoA and the sequence number. This is done to ensure that TEAR DOWN and CONFIRM messages (which are both generated at the crossover router) are not erroneously generated, for example, in response to a spoofed QoS signaling packet. Another type of key-based authentication on the QoS signaling packet may be performed if the QoS signaling packet includes the optional signature for the immutable parameters (e.g., 220; FIG. 2) as discussed later.

On the other hand, cookie-based authentication is generally used by all respective QoS nodes to preserve the integrity of communications between nodes.

Figure 4:
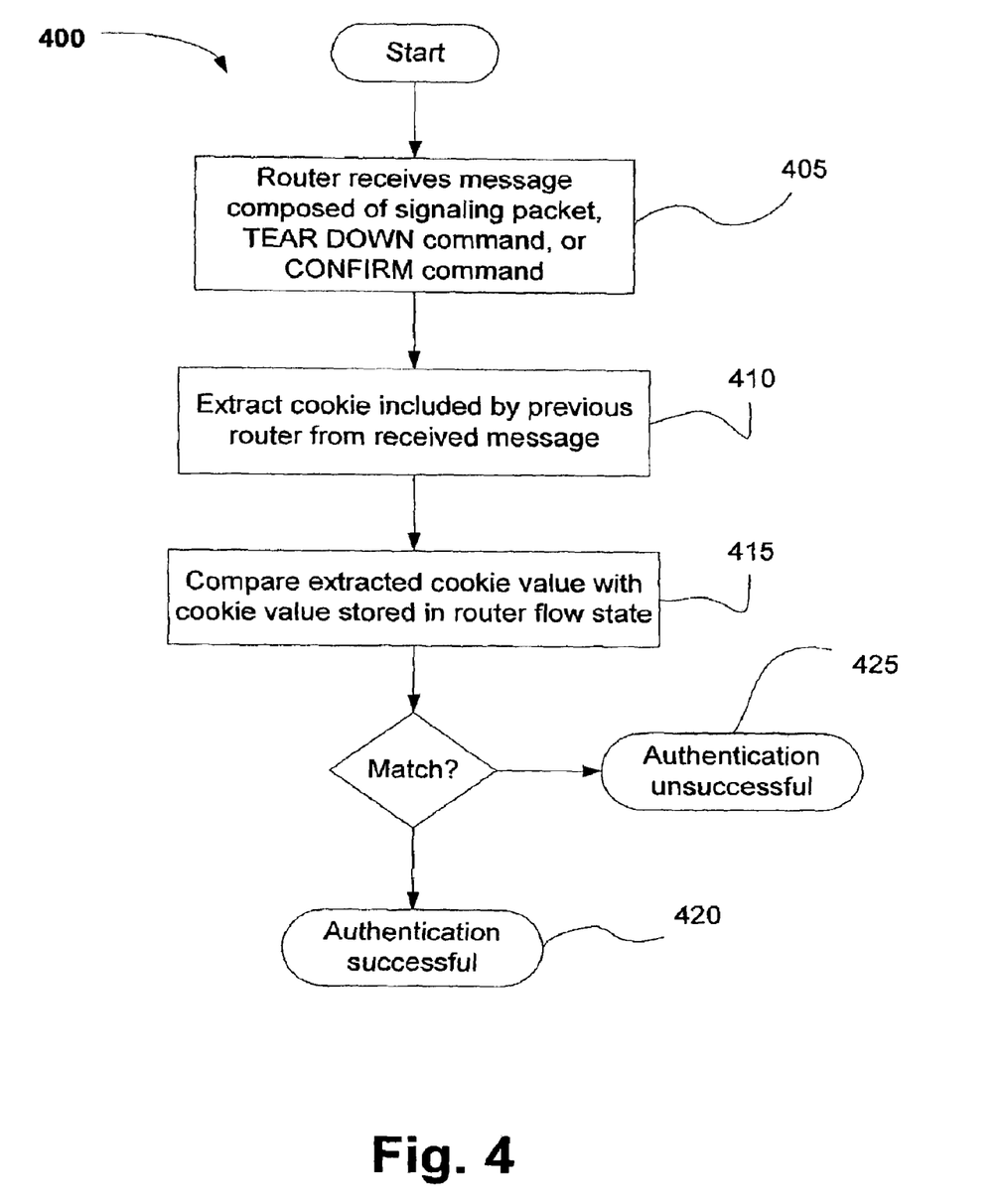
FIG. 4 is a flow chart illustrating a method of authenticating messages in a mobile IP network in accordance with one embodiment of the present invention.

Referring to FIG. 4, a method 400 for authenticating router messages using a cookie-based scheme includes receiving 405 a message (such as a QoS signaling packet, TEAR DOWN or CONFIRM message) at a router, extracting 410 a cookie contained in the message, the cookie inserted into the message by a previous router which processed the message, comparing 415 the extracted cookie value to a stored cookie value, the stored cookie value obtained from a previous cookie extracted from a message previously sent to the router from the previous router, and authenticating the message 420 if the values match or not authenticating 425 the message if the values do not match.

Figure 5:
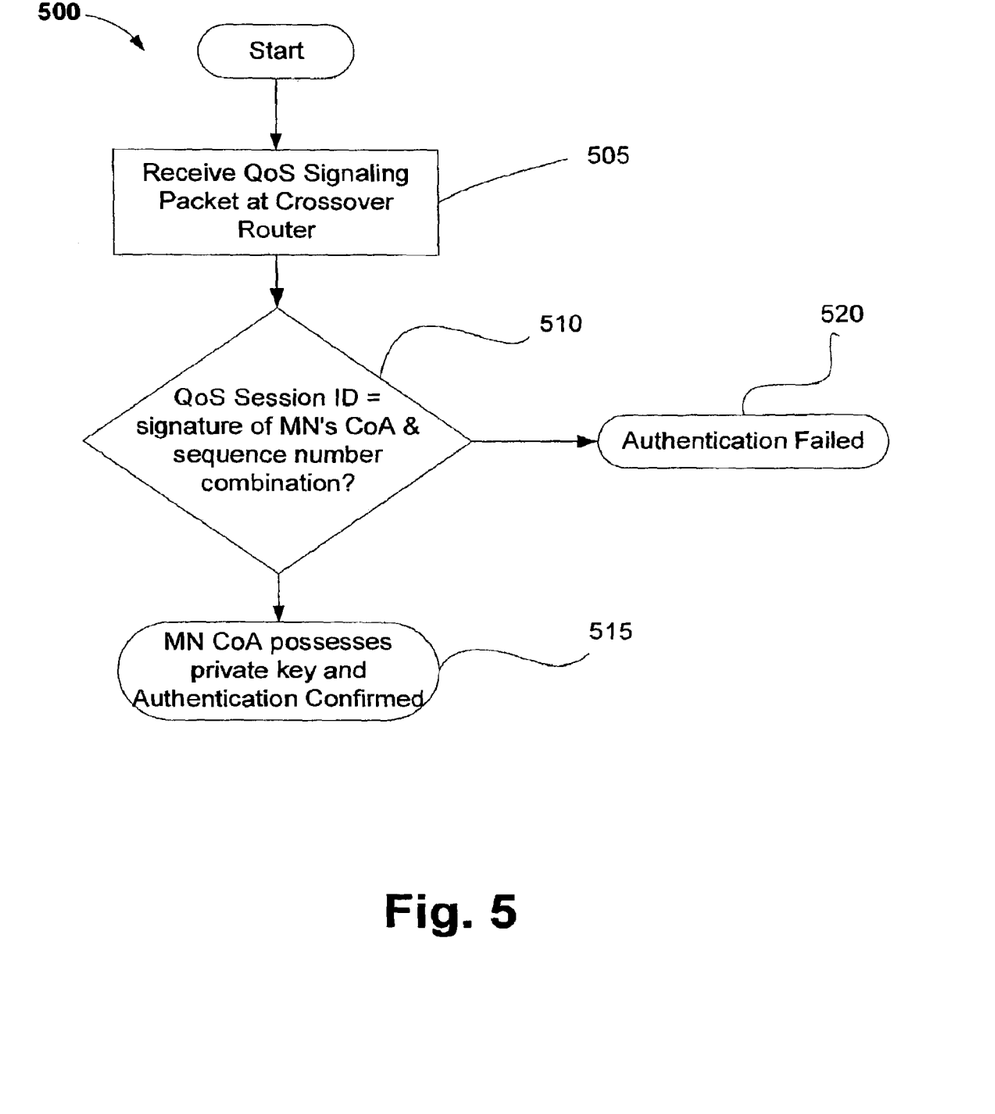
FIG. 5 is a flow chart detailing a method for authenticating a QoS signaling packet at a crossover router in accordance with an embodiment of the present invention.

Preferably the crossover router authenticates the QoS signaling packet based on a signature verification of the QoS session ID as described in greater detail below in reference to FIG. 5 and if the authentication succeeds, the crossover router sends a TEAR DOWN message to tear down the QoS along the segment of the old packet path (for example, in FIG. 1, the segment between old AR 110 and the crossover router 116) that is no longer used after handoff. The TEAR DOWN message is forwarded from crossover router 116 to old AR 110 that previously facilitated connection of MN 105. The IP addresses of the previous routers (that processed the QoS signaling packet) stored along with the flow states in routers may be used to retrace this packet path from the crossover router to the old AR. The TEAR DOWN message sent from a router to its previous (QoS) hop router should also contain the cookie of the previous (QoS) hop router that is stored in the flow state at the originating router. (A QoS hop is a hop between two QCs and there could be more than on IP hop corresponding to one QoS hop).

The previous (QoS) hop router ensures that this cookie is the same as that inserted by it earlier in the QoS signaling packet. Thus, the cookies are used to authenticate the TEAR DOWN messages and other messages on successive (QoS) hops. This mechanism safeguards against malicious nodes sending TEAR DOWN messages to routers for disrupting the existing QoS of the MN.

On the other hand, if key-based authentication of the QoS signaling packet fails at the crossover router, the crossover router sends a TEAR DOWN message as described above to tear down the QoS established along the segment of the packet path which were just established (i.e., the segment between the new AR and the crossover router). Again, the cookies may be used to authenticate the TEAR DOWN message if desired.

(4) Confirming the QoS Establishment Along the New Segment of Path:

Upon successful key-based authentication, the crossover router may also send a CONFIRM message back toward the new AR to corroborate the flow states along the new segment of the packet path (that is, the QoS path between the crossover router and the new AR). The IP addresses of the previous routers (that processed the QoS signaling packet) stored along with the flow states in the routers are used to retrace this packet path from the crossover router back to the new AR. The cookie-based scheme described above may also be used to authenticate the CONFIRM messages.

(5) Forwarding the QoS Signaling Packet Beyond the Crossover Router:

Upon successful key-based authentication, the crossover router forwards the QoS request to the CN, so that subsequent nodes on the path (which have not changed for the handoff) can update the QoS session ID, sequence numbers, classifier parameters and/or cookies associated with their flow state. The crossover router includes an indicator to inform the next nodes that key-based authentication has been performed and thus the next nodes do not have to perform this authentication of the QoS signaling packet, which requires additional processing, unless desired. Along with such indicator, each router on the path from the crossover router to the CN including the crossover router, also includes the cookie that it sent out before (during QoS setup) to the next hop router. This cookie is used to safeguard against spoofing attacks wherein malicious nodes send QoS modification message with such indicator turned on thereby evading authentication check by routers.

(6) Authenticating the QoS Signaling Packet:

The authentication mechanism described here for the QoS signaling packet (and the cookie-based authentication mechanism described in Sections 3 and 4 above for the TEAR DOWN and CONFIRM messages) are proposed based on the following threat analysis: First, consider an ideal situation wherein during QoS establishment, the initial AR creates a QoS session ID (say, simply as a random number) and this is used in future to identify the flow irrespective of the changes in the CoA for the MN. For every handoff, context transfer (horizontal signaling) executes successfully and the new AR launches the QoS signaling packet toward the CN. In this case, the QoS session ID never appears on the wireless link (between the MN and the ARs), and hence, a malicious node cannot eavesdrop on it. Further, the malicious node cannot disrupt the QoS of the MN without knowing the QoS session ID. In such an ideal situation, spoofing attacks are practically impossible.

However, in practice there might be a handoff instance when the context transfer fails, and hence, the MN has to launch the QoS signaling packet instead of the new AR. In this case, the QoS session ID would appear on the wireless link thus potentially allowing malicious nodes to eavesdrop on it. To prevent this eavesdropping, the MN could send the QoS signaling packet to the AR in a secure tunnel making spoofing attacks extremely difficult.

However, if one insists that the handoff QoS signaling from the MN be secure without requiring the secure tunnel and in the light of possibility of the malicious node eavesdropping, a security mechanism may be implemented based on the QoS session ID generated as the hash of the MN's CoA and sequence number using the MN's private key. (The cookie-based mechanism described previously achieves the same purpose for TEAR DOWN and CONFIRM messages).

(7) Authentication at the Crossover Router:

The crossover router may perform key-based authentication of the QoS signaling packet to ensure that malicious nodes do not spoof the QoS signaling packet and disrupt the existing QoS for the MN. For example, a malicious node could launch such a spoofing attack if the node eavesdrops on the previous signaling from the MN to determine the current QoS session ID. The node could then launch a fraudulent QoS signaling packet with this value as the previous QoS session ID, either from a different CoA or with a reduced QoS requirement. Such an attack can be prevented, referring to FIG. 5, by the following method for QoS following signature authentication method 500.

A router receives 505 a QoS signaling packet and identifies itself as the crossover router (discussed previously in Section 3). The crossover router uses the QoS flow public key stored in the existing flow state and evaluates 510 whether the new QoS session ID in the received QoS signaling packet is the signature of the combination of the MN's CoA and the sequence number. If so, this means that the MN at this CoA does possess the private key, and thus it is the correct MN and the signature authentication is confirmed 515. Otherwise, the authentication is deemed to have failed 520.

The inclusion of the sequence number in calculating the QoS session ID prevents against a replay attack in which a malicious node eavesdrops on one of the QoS session IDs generated by the MN (say on the same link), and later replays it (possibly from the same CoA that the MN held before) after the MN departs from the link.

Such an attack is foiled by requiring the crossover router to reject (and thereby declare authentication failure) a QoS signaling packet with a sequence number not greater than that associated with the existing flow state. Using this requirement, in order for a spoofed signaling packet to be accepted by the crossover router, the malicious node would have to increment the sequence number. However, the signature of the MN's CoA and sequence number combination would change and the malicious node could not calculate the correct signature without also having the MN's private key.

In one aspect of the present invention, the QoS session ID is used for two purposes: (i) to identify the flow despite a change in the CoA of the MN, and (ii) as a hash value for key-based authentication of the QoS signaling packet. Alternatively, it is possible to use a separate ID (for example, based on the home address (HoA)) for the flow identification.

Even with these measures, one more spoofing attack possibility still exists. This attack works as follows. Suppose that the malicious node and the MN are on the same link such as 802.11 WLAN, and the MN has to launch the QoS signaling packet from itself (as opposed to it being launched by the AR when the context transfer is executed successfully) without using a secure tunnel between itself and the AR. The malicious node eavesdrops on the QoS session ID and then spoofs the MN's CoA and launches another QoS signaling packet containing a reduced QoS request. If the QoS signaling packet launched by malicious node overtakes the packet launched by the MN, it may cause QoS disruption. To foil such attack, in one embodiment of the invention, the system includes the signature (e.g., 220; FIG. 2) of the immutable fields in the QoS signaling packet generated using the MN's private key. The crossover router can then run the MN's public key on the immutable fields and verify their integrity.

A malicious node can also launch a spoofing attack with an arbitrary value for the previous QoS session ID, thereby creating false flow states in the intermediate routers. However, such a QoS signaling packet can be determined to be a spoofed packet as either one or both of the following tests would fail: (i) the CN would not have a binding update for this CoA since the spoofing attack has been launched from a CoA different from the MN's true CoA, and (ii) the AR to which CN is attached would not have a matching QoS session ID (note: an AR to which CN is attached needs to have a matching QoS session ID). Accordingly, A TEAR DOWN message would then be sent to tear down these fake flow states.

Negotiation

In the above discussion, we assumed that the routers along the new packet path agree to provide the requested QoS to the MN. However, in practice, some of the routers may not agree to provide the specified QoS requested in the QoS signaling packet, but may instead offer a reduced QoS. To cope with this situation, a two bit flag may be in the QoS signaling packet. If the first bit ("negotiation flag") is turned off, it implies that the QoS request is non-negotiable. In other words, if some router cannot offer the requested QoS, it rejects the QoS request and sends a TEAR DOWN message to tear down QoS along the uplink packet path from the MN to this router in a similar way as described in Section 3 above. The denying router may also send a TEAR DOWN message towards CN. This TEAR DOWN message serves the purpose of tearing down the QoS along the path from crossover router to CN. This TEAR DOWN message should contain sufficient information from the QoS signaling packet (e.g., new CoA, new sequence number and new QoS session ID) to enable the crossover router to authenticate the TEAR DOWN message (similar to that described in Section 3 above).

The crossover router also sends the TEAR DOWN message to tear down QoS along the old segment of the uplink packet path. The crossover router also forwards the original TEAR DOWN message toward the CN to tear down the QoS along the path from itself to the CN. A cookie-based authentication, as described in Section 5, may be used for this TEAR DOWN message.

If the negotiation flag in the QoS signaling packet is turned on, it implies that the request is negotiable. In this case, the router may respond with an offer a reduced level of QoS.

The second bit in the flag ("notification flag") may be used to indicate whether the MN wants to be notified about the reduced QoS offering at intermediate nodes. When the notification flag is turned on (and of course, the negotiation flag is also turned on), if some intermediate node on the new segment of the uplink packet path cannot offer the QoS requested in the QoS signaling packet, the node can offer a reduced QoS and include a description of the offered QoS in the mutable fields of QoS signaling packet. When the crossover router receives this QoS signaling packet and notices that the offered QoS is less than the requested QoS at one of the intermediate routers (and that notification flag is tamed on), the crossover router sends a copy of QoS signaling packet back to the MN. The MN (or the AR acting on its behalf) can thus examine the description of the reduced QoS and may decide whether to accept the reduced QoS or reject it.

If the MN decides to reject the reduced QoS, a TEAR DOWN message is sent by the MN (or the AR acting on its behalf) toward the CN. The TEAR DOWN message preferably includes the MN's CoA, sequence number, a new QoS session ID generated as a hash of first two, and the previous QoS session ID. The first router (that maintains the flow state) closest to MN authenticates the TEAR DOWN message as described in Section 6 for the crossover router. The authentication from this router to the CN may be cookie-based.

Downlink QoS

The downlink procedure may be similar to the previously described uplink with the following differences. If applicable (i.e., if the flow has bi-directional QoS requirements), the QoS signaling packet is sent by the AR of the CN toward the new CoA of the MN as soon as the CN is ready to send packets to the new CoA of the MN (for example, immediately after confirming the new CoA of MN). The QoS session IDs for the downlink direction may be generated using the CN's private key.

In one aspect of the invention, in the downlink direction, a router identifies itself as a "crossover router" as follows: When a router (that needs to examine flow specific information) receives and examines the QoS signaling packet notices that it does not have an existing flow state for this flow (after comparing previous QoS session ID in the signaling packet with the QoS session IDs associated with the existing flows at the router), it informs the previous router whose address is found in the previous router field of the QoS signaling packet that this previous router was a crossover router. The router makes a note in the QoS signaling packet (for example, by setting a specified flag bit) that the crossover router has already been located to prevent subsequent routers (which also do not have the existing flow state for this flow) from erroneously inferring that the previous router was the cross over router.

In an alternate embodiment in the downlink direction, a router identifies itself as a crossover router if (i) it has an existing flow state with the same QoS session ID as a previous QoS session ID contained in the QoS signaling packet; and (ii) an old next router address (to which the QoS signaling packet was forwarded before) is different from the new next router address (to which the QoS signaling packet is currently forwarded to). To enable this, the IP address of the next router to which QoS signaling packet is forwarded must be stored along with the flow state.

The crossover router may send a TEAR DOWN message toward the old CoA of the MN. The routers along the new packet path from the crossover router to the new AR of the MN may or may not provide the requested QoS. If so, the new AR may send a CONFIRM message to update the flow states along the new packet path. If hot, theses routers may offer a reduced QoS (for example, if the "negotiation flag" is on) and include a description of the reduced QoS in the mutable fields of the QoS signaling packet. The MN (or new AR acting on its behalf examines this reduced QoS offering an sends either a CONFIRM or TEAR DOWN message toward the CN, depending on whether it accepts or rejects the reduced QoS. The previous router IP addresses stored in the flow states may be used to forward CONFIRM and TEAR DOWN messages as previously discussed.

The TEAR DOWN message may be propagated up to the CN. The CONFIRM message may be intercepted at the crossover router, but may also be propagated up to the CN. TEAR DOWN and CONFIRM messages may be authenticated using the cookie-based mechanism described earlier.

In the downlink direction, key-based authentication of the QoS signaling packet (similar to that described in Section 6) may be performed. The key-based authentication is typically performed by the first router (that maintains the flow state) near the CN such as the AR of the CN. In one implementation of the present invention, once the AR (or other router) authenticates the QoS signaling packet, a flag is set in the signaling packet to inform subsequent routers that the public/private key-based authentication has already been performed. After that the QoS signaling packet on subsequent QoS hops up to the cross over router may be cookie-based as previously discussed.

Unless contrary to physical possibility, the inventors contemplate the methods, protocols and systems described herein: (i) may be performed in any sequence and/or combination; and (ii) the components of respective embodiments combined in any manner.

Although there have been described preferred embodiments of this novel invention, many variations and modifications are possible and the invention is not limited to the specific embodiments described above, but rather should be limited only by the scope of the appended claims and their legal equivalents.

What is claimed is:

1. A method of authenticating a QoS message, the method comprising:
   receiving the message at a node;
   extracting a cookie included in the message by a previous node that formerly processed the message;
   comparing a value of the extracted cookie with a cookie value stored in an existing flow state container, wherein the existing flow state container includes information for a QoS flow presently supported by the node including a current QoS session ID of the QoS flow and an associated QoS flow public key; and
   authenticating the message if the extracted cookie value matches the stored cookie value.

2. The method of claim 1, wherein the message comprises a QoS signaling packet.

3. The method of claim 2, wherein the message comprises a message to tear down a segment of an old QoS flow path.

4. The method of claim 2, wherein the message comprises a message to corroborate flow states along a new segment of a QoS flow path.

5. The method of claim 2, wherein the signaling packet includes a signature associated with a private key of a mobile node.

6. The method of claim 1, further comprising not authenticating the message if the extracted cookie value does not match the stored cookie value.

7. The method of claim 1, wherein the extracted cookie is associated with the existing flow state container.

8. The method of claim 1, wherein the extracted cookie is a random numeric or alphanumeric series of characters inserted by the previous node.

9. The method of claim 1, wherein the existing flow state container further includes a classifier parameter and a sequence number.

10. The method of claim 1, further comprising storing a QoS flow public key and a sequence number at the node.

11. A method of authenticating whether a QoS signaling packet was generated by a mobile node in a mobile IP network, the signaling packet including a QoS session ID, a new care of address and a sequence number, the method comprising:

receiving the signaling packet at an intermediate node;
   determining whether the QoS session ID in the signaling packet is a private key signature of a combination of the mobile node's new care of address and the sequence number by performing a cryptographic verification using a mobile node public key; and
   authenticating the signaling packet if the QoS session ID is the combination;
   else not authenticating the signaling packet.

12. The method of claim 11, wherein the signaling packet further includes one or more mutable parameters that may be changed along a QoS data path for verifying nodes of the QoS data path.

13. The method of claim 12, wherein the one or more mutable parameters comprise a router address or a cookie.

14. The method of claim 12, wherein the signaling packet includes a negotiation flag that indicates the mobile node should be notified about a reduced QoS offering from the intermediate node.

15. The method of claim 11, further comprising sending, from the intermediate node, a message to tear down a segment of an old QoS flow path if the QoS session ID is not the private key signature of the combination.

16. The method of claim 11, further comprising sending, from the intermediate node, a message to corroborate a flow state along a new segment of a QoS flow path if the QoS session ID is the private key signature of the combination.

17. The method of claim 11, wherein the intermediate node is a crossover router.

18. The method of claim 11, wherein the signaling packet includes a negotiation flag that indicates that a QoS request is non-negotiable.

19. The method of claim 11, further comprising indicating in the signaling packet that a crossover router has been located.

* * * * *